Feb. 18, 1964 A. A. JORGENSEN ETAL 3,121,801

LINE CIRCUIT

Filed May 3, 1961

INVENTORS.
ADAM A. JORGENSEN
GUENTER SAGER
BY

George W. Killian
AGENT 3,121,801

LINE CIRCUIT

Adam A. Jorgensen, Victor, and Guenter Sager, Fairport, N.Y., assignors to General Dynamics Corporation, Rochester, N.Y., a corporation of Delaware Filed May 3, 1961, Ser. No. 107,502
6 Claims. (Cl. 307—88)

This invention relates in general to a signal circuit and, more particularly, to a signaling system employing magnetic cores having a generally square shaped hysteresis loop.

Although the invention herein disclosed is suitable for more general applications, it is particularly well suited for use in the line circuit of a time division multiplex telephone system. In such telephone systems it is necessary to couple multiplexing signals to a data highway indicative of the on- or off-hook character of the associated telephone instrument. The on- or off-hook character of the line is conventionally determined in accordance with the magnitude of the D.C. current flowing in the loop. Various means have been proposed for responding to the D.C. loop current but, until the present, they have exhibited handicaps which have prevented their full acceptance in time division multiplex systems. The disadvantages of the prior art line circuits include their limited range of sensitivity, the use of delicate, expensive, or bulky parts, some of which required routine inspection and periodic mechanical adjustment. Accordingly, it is the general object of this invention to provide a new and improved line circuit for a time division multiplex telephone system.

It is another object of this invention to provide a solid state line circuit for use in a time division multiplex telephone system.

It is another object of this invention to provide a circuit which produces an output signal in response to an input signal only when there is current of a predetermined magnitude in a control circuit.

Further objects and advantages of the invention will become apparent as the following description proceeds, and features of novelty which characterize the invention will be pointed out in particularity in the claims annexed to and forming a part of this specification.

A complete understanding of the invention may be obtained by making reference to the following specification and the accompanying drawings wherein.

It is to be understood that only the details of the circuit necessary for a complete understanding of the invention have been shown. For example, FIGURE 1 illustrates the details of a line circuit in a time division multiplex telephone system but does not illustrate the means for generating the multiplexing pulses or the details of the telephone instrument connected to the line circuit.

As is well known, a telephone instrument includes a dial which, in response to an operation thereof, produces a number of pulses, or circuit interruptions, corresponding to the value of the digit dialed. The dial is caused to interrupt the flow of direct current to the instrument. Accordingly, the central office telephone equipment must include some means for detecting and responding to the momentary interruptions of current. In the widely used electromechanical systems, a D.C. relay is included in the circuit to repeat the dial pulses to cause the associated equipment to function in the desired manner. However, in electronic telephone system, the use of relays in line circuits is considered undesirable because of their cost, weight, size, and maintenance requirements in relation to the other components used in the system. Therefore, the circuit of the present invention is well adapted for use in time division multiplex telephone systems as it produces the type of output signal required while using a minimum number of light weight and inexpensive elements which have no moving parts and therefore require no routine adjustment.

The invention employs magnetic cores which are made of a material which is commonly said to have a square shaped hysteresis loop. Such cores are widely used and conventionally are formed in a torroidal shape. Suitable cores for use in the circuit of FIGURE 1 may be obtained which are well under one-quarter of an inch in outside diameter. After the cores have been wound with the required windings, it is conventional to place the whole assembly in a housing and fill the remaining space with an epoxy resin through which leads for the necessary connections are brought.

Figure 1:
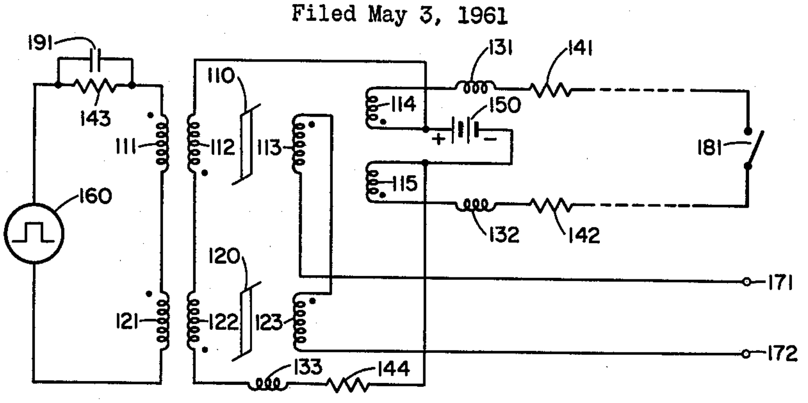
FIGURE 1 illustrates the circuit details of a time division multiplex telephone system line circuit which incorporates the present invention.
Figure 2:
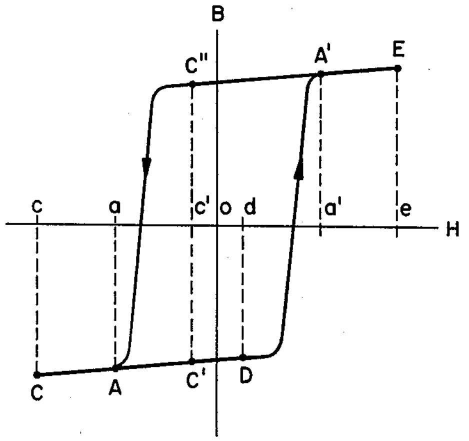
FIGURE 2 illustrates a typical hysteresis loop of the core material employed in the magnetic component of the circuit of FIGURES 1 and 3.

It is believed that the operation of the present invention, when incorporated in a time division multiplex telephone system, may best be understood by considering the circuit of FIGURE 1. A first square wave magnetic core which has windings 111, 112, 113, 114, and 115 is designated 110, and a second square wave magnetic core which has windings 121, 122, and 123 is designated 120. A typical hysteresis loop for the magnetic cores is shown in FIGURE 2. As is conventional, the magnetizing force is plotted along the abscissa and is designated H, while the magnetic flux density is plotted as the ordinate and is designated B, thereby providing the familiar B—H curve. It will be noted from the B—H curve of FIGURE 2 that if a magnetizing force of a magnitude equal to *oa* is applied, that the core will be in one state of saturation. If the magnetizing force is slowly reduced, it will be noted that as the operating point moves from A to C′ to D that there is very little change in flux density (B). But shortly after the operating point is moved past point D there will be a very large change in the flux density in response to a small change in the magnetizing force and the core will be switched to the opposite state of saturation. Cores of this nature are widely used in memory devices and when a core is caused to reverse its state of saturation, it is customary in the art to refer to the core as having been switched. Quite obviously, if a winding is included on the core in addition to the one which provides the magnetizing force, a potential will be induced in the additional winding each time the core is switched from one state to another. Naturally, the polarity of the output potential is determined by the direction in which the core was caused to switch.

The windings 112 and 122 on cores 110 and 120 are connected in series with a current limiting resistor 144 to a D.C. power supply 150 to provide a biasing current in each of said cores. The potential source 150 and the resistor 144 may be adjusted to cause windings 112 and 122 to bias each of the cores with a magnetizing force having a sufficient magnitude of ampere turns to place the cores in a predetermined state of magnetization, such as point A on the hysteresis curve of FIGURE 2. Thus, power supply 150 provides each core with a magnetizing force equal to *oa* ampere turns. If a current is caused to flow in windings 111 and 121, the magnitude of the magnetizing force in each of the windings will be increased or decreased depending upon the direction of the current from power supply 160 which may be a source of potential varying intermittently between two limits. The magnetizing force from windings 111 and 121 may move the operating point of the cores either toward point C or C′ from point A. If the current in windings 111 and 121 is such as to cause the operating point to move towards C′ and D and the current in the winding is increased, the operating point will suddenly be moved to point A′ causing a resulting reversal of the state of magnetization and causing a potential to be induced in windings 113 and 123. If the potential of source 160 is intermittently altered between two limits to cause the operating point to shift from A to A′ through point C′ and D and then allowed to return to point A through point C″, there will be an A.C. potential induced in windings 113 and 123. If the windings 113 and 123 are connected in the opposite sense, as indicated in FIGURE 1, the resultant output potential between terminals 171 and 172 will be the difference between the potentials induced in each winding as the potential in each winding will effectively counteract the other. Accordingly, if cores 110 and 120 are considered to be identical and windings 111, 112, and 113 are identical to windings 121, 122, and 123, respectively, and windings 114 and 115 are presumed to have no current, it will be observed that there will be no output potential between terminals 171 and 172 if both cores switch their state of magnetization simultaneously.

When the circuit of FIGURE 1 is used as a line circuit in a time division multiplex telephone system, the windings 114 and 115 are connected in series, in the same sense, with a power supply 150 and the subscriber's line, represented by resistors 141 and 142, to the control contacts at the telephone instrument, represented by contacts 181. Thus, contacts 181 can control the flow of current in windings 114 and 115 and thereby control the magnitude of the net magnetizing force of core 110. Depending upon the connection of the windings 114 and 115, the magnetizing forces from these windings and from winding 112 may add or subtract. That is, the operating point may be moved from point A towards either C or C′.

For the present, it will be assumed that the forces subtract and that the operating point of core 110 is moved towards point C′. Of course, core 120 remains at point A due to the magnetizing force provided by the current in winding 122. With these conditions, let it be assumed that a pulse of current is passed through windings 111 and 121 in series and that the magnitude is so controlled that a magnetizing force of magnitude *ad* is produced to move the operating point of core 120 to point D. The same magnetizing current in winding 111 will move the operating point of core 110 to point A′, thereby resulting in a switching operation of core 110 which induces a potential in winding 113. Since core 120 did not switch, no potential was induced in winding 123 and the potential induced in winding 113 appears across output terminals 171 and 172.

If it is assumed that the current in windings 114 and 115 is in the opposite direction, to that previously assumed, and that, therefore, the magnetizing forces in core 110 add together, it will be found that the same final resultant of an output potential at terminals 171 and 172 may be obtained. In this case, the operating point of core 110 may be assumed to be moved back to point C. Under these circumstances, the potential source 160 would be arranged to produce a pulse of current of sufficient magnitude to produce a magnetizing force of magnitude *aa′* and in the direction to cause core 120 to shift its operating point from A to A′. The same magnetizing force shifts the operating point of core 110 to point D. Accordingly, a potential is induced only in winding 123 and that potential will appear at output terminals 171 and 172.

In either of the cases, described above, if the power source 160 is caused to produce intermittent pulses to produce a magnetizing force of the magnitude described in each case, it will be observed that only one of the cores is caused to switch states of magnetization in response to each pulse of current and that, therefore, an output signal will be produced in response to each input signal.

Another alternate method of operation may be used. Let it be assumed that both cores 110 and 120 are biased to point A by a current in windings 112 and 122 and that a current in windings 114 and 115 cause core 110 to be shifted to an operating point such as point C′. Then if a magnetizing force of magnitude *aa′* is applied to windings 110 and 121 in series, both cores will be switched. Core 120 will switch from point A to point A′, while core 110 will switch from C′ to E. If the power supply 160 provides intermittent input signals of the magnitude described, core 120 will switch between points A and A′ in the direction indicated by the arrows, while core 110 will not be switched but will have its operating point moved between points E and C″. Therefore, a potential will be produced at the output terminals 171 and 172 in response to each input signal from source 160.

Accordingly, any one of the operating methods described will cause the circuit of FIGURE 1 to produce an output signal in response to an input signal when there is current in a control winding.

In a time division multiplex telephone system, it is expedient to gate multiplexing pulses to a data highway under control of the subscriber's dial. Thus it will be seen that the circuit of FIGURE 1 may be used for this application if the potential source 160 is considered to be replaced by the source of multiplexing signals and the output terminals 171 and 172 are suitably coupled to the data highway.

The circuit of FIGURE 1 has some ancillary advantages and features of interest and use. For example, it has already been shown that when contacts 181 are open, no potential will be produced between output terminals 171 and 172 in response to an input signal. The circuit components can readily be adjusted to be insensitive to control currents in windings 114 and 115 below a predetermined magnitude. The windings 131, 132, and 133 are R-F coils which serve to decouple the pulse circuit from the D.C. circuit. Capacitor 191 serves to reduce the delaying effect of the residual inductance of core 110 on the leading edge of the output pulse.

A special embodiment of the invention adapted for use in a time division multiplex telephone system has been illustrated and described. A more general circuit for a wider variety of uses is shown in FIGURE 3.

Figure 3:
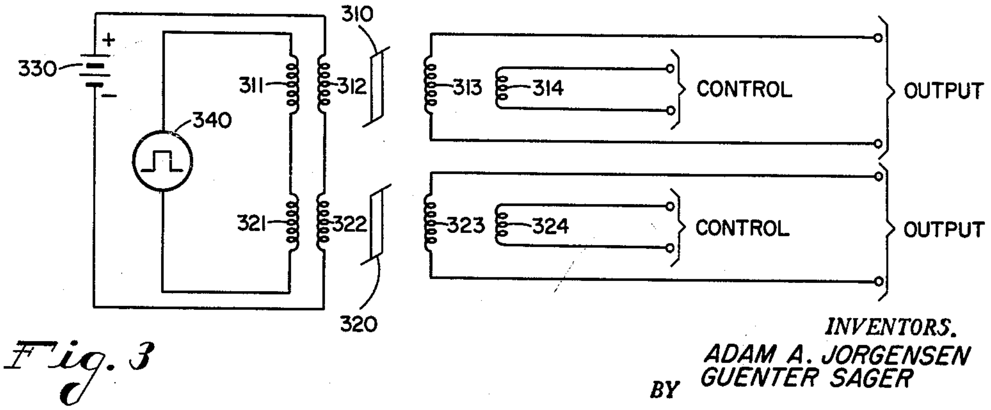
FIGURE 3 illustrates a more general embodiment of the invention.

FIGURE 3 shows two cores 310 and 320, each of which has biasing windings 311 and 321, respectively, which are connected in series. The cores are also provided with input windings 312 and 322, respectively, which are connected in series. In some applications, it might be expedient to combine these windings into a single pair and to provide the desired biasing magnetizing force by superimposing the A.C. input on a suitable D.C. potential. In addition, each of the cores is provided with separate control windings 314 and 324, respectively, and separate output windings 313 and 323, respectively.

The circuit of FIGURE 3 thus permits more flexible operation than the specialized embodiment of the invention shown in FIGURE 1 since separate control biases may be coupled to each core and each core has individual output windings. It should be noticed that each time an input potential is applied to the circuit that the circuit conditions should be such that at least one of the cores is caused to switch in order to present a high impedance input to the input power supply.

While there has been shown and described a preferred specific embodiment and a general embodiment of the invention, modifications thereto will readily occur to those skilled in the art. It is not desired, therefore, that the invention be limited to the embodiments shown and described, and it is intended to cover in the appended claims all such modifications as fall within the true spirit and scope of the invention.

What is claimed is:

1. In a signaling system, first and second square loop magnetic cores each capable of being magnetized to first and second states of magnetization, first means coupled to each of said cores for biasing each of said cores with a first magnitude of ampere turns to normally maintain said cores in said first state of magnetization, second means coupled to one of said cores for selectively altering the magnitude of said biasing ampere turns to a second magnitude without changing the state of magnetization of said one of said cores, third means for coupling a momentary signal of sufficient magnitude to said cores to switch one of said cores to said second state of magnetization when said first and second cores have said first and second magnitudes of biasing ampere turns, respectively, and fourth means coupled to said cores for providing a signal indicative of which one of said cores switched states of magnetization in response to said momentary signal when said first and second cores had said first and second magnitudes of biasing ampere turns, respectively.

2. The combination set forth in claim 1 wherein said second magnitude of biasing ampere turns is less than said first magnitude and wherein the core switched in response to said momentary signal is the core with said second magnitude of biasing potential when the other core has said first magnitude of biasing potential.

3. The combination set forth in claim 1 wherein said second magnitude of biasing ampere turns is greater than said first magnitude and wherein the core switched in response to said momentary signal is the core with said first magnitude of biasing potential when the other core has said second magnitude of biasing potential.

4. The combination set forth in claim 1 wherein said fourth means includes means for inhibiting any indicating signal in response to said momentary signal when said first and second cores have equal magnitudes of biasing ampere turns.

5. The combination set forth in claim 1 wherein said third means includes means for coupling an intermittent signal of sufficient magnitude to said cores to selectively switch the one of said cores which has the smaller magnitude of biasing ampere turns between said first and second states of magnetization when said cores have different magnitudes of biasing ampere turns.

6. The combination set forth in claim 5 and including means in said fourth means for providing a signal in response to each switching operation of the core which is selectively switched.

References Cited in the file of this patent

UNITED STATES PATENTS

| | | |
|---|---|---|
| 2,814,737 | Sunderlin | Nov. 26, 1957 |
| 2,862,112 | Ringelman | Nov. 25, 1958 |
| 2,977,481 | Rosa | Mar. 28, 1961 |